United States Patent
Song et al.

(10) Patent No.: US 12,541,183 B2
(45) Date of Patent: Feb. 3, 2026

(54) APPARATUS AND METHOD FOR MANAGING ENERGY STORAGE POWER STATION

(71) Applicant: SHANGHAI MAKESENS ENERGY STORAGE TECHNOLOGY CO., LTD., Shanghai (CN)

(72) Inventors: Pei Song, Shanghai (CN); Enhai Zhao, Shanghai (CN); Danfei Gu, Shanghai (CN); Pingchao Hao, Shanghai (CN); Peng Ding, Shanghai (CN); Weikun Wu, Shanghai (CN); Guopeng Zhou, Shanghai (CN); Xiao Yan, Shanghai (CN); Xiaohua Chen, Shanghai (CN)

(73) Assignee: SHANGHAI MAKESENS ENERGY STORAGE TECHNOLOGY CO., LTD., Shanghai (CN)

( * ) Notice: Subject to any disclaimer, the term of this patent is extended or adjusted under 35 U.S.C. 154(b) by 444 days.

(21) Appl. No.: 18/115,094

(22) Filed: Feb. 28, 2023

(65) Prior Publication Data
US 2023/0273583 A1 Aug. 31, 2023

(30) Foreign Application Priority Data
Feb. 28, 2022 (CN) .......................... 202210190160.1

(51) Int. Cl.
*B60L 53/60* (2019.01)
*G05B 19/042* (2006.01)
*H01M 10/42* (2006.01)

(52) U.S. Cl.
CPC ............ *G05B 19/042* (2013.01); *B60L 53/60* (2019.02); *G05B 2219/21109* (2013.01); *H01M 2010/4271* (2013.01); *H01M 2010/4278* (2013.01)

(58) Field of Classification Search
CPC ........ G05B 19/042; G05B 2219/21109; B60L 53/60; H01M 2010/4271; H01M 2010/4278
See application file for complete search history.

(56) References Cited

U.S. PATENT DOCUMENTS

| 2016/0359329 A1* | 12/2016 | Kim | .................... | H01M 10/425 |
| 2022/0234602 A1* | 7/2022 | Chen | .................... | G05B 19/042 |
| 2022/0244691 A1* | 8/2022 | Dannar | ................ | G05B 19/042 |

FOREIGN PATENT DOCUMENTS

CN 113690978 A * 11/2021 ........ H01M 10/4285

* cited by examiner

*Primary Examiner* — Michael W Choi
(74) *Attorney, Agent, or Firm* — troutman pepper locke; Tim Tingkang Xia, Esq.

(57) ABSTRACT

The invention provides an apparatus and a method for managing an energy storage power station. The apparatus includes: a first main control module communicatively connected with a battery cluster management unit (BCMU) for collecting battery information of the first priority in an energy storage power station system, and performing protection and control on the energy storage power station system according to the battery information of the first priority; and a second main control module communicatively connected with the first main control module and the BCMU, respectively, for collecting battery information of the second priority in the energy storage power station system. The second main control module operably transmits the collected battery information of the second priority to the first main control module. The first main control module operably manages the battery information of the first priority and the battery information of the second priority in a unified manner.

5 Claims, 4 Drawing Sheets

APPARATUS AND METHOD FOR MANAGING ENERGY STORAGE POWER STATION

CROSS-REFERENCE TO RELATED PATENT APPLICATION

This application claims priority to and the benefit of Chinese Patent Application No. 202210190160.1, filed Feb. 28, 2022, which are incorporated herein in their entireties by reference.

FIELD OF THE INVENTION

The invention relates generally to the field of power managements, and more particularly to method and apparatus for managing energy storage power station.

BACKGROUND OF THE INVENTION

At present, an energy storage system has characteristics of high operating power, high grounding requirements, high isolation withstand voltage requirements, strong anti-interference ability, and complex wiring. In addition, the number of batteries in an energy storage power station is large, the amount of data is large, and the real-time requirements are high, which determines that the communication of the energy storage system needs to have long-distance, high-speed, real-time and reliable communication in complex electromagnetic environments. Considering these factors, currently energy storage power stations mostly adopt a three-level architecture battery management system, which includes a battery management unit (BMU), a battery control unit (BCU)/a battery cluster management unit (BCMU), and a battery array management unit (BAMU). The communication processes of these units include: BMU→BCMU, BCMU→BAMU, and BAMU→EMS (Energy Management System).

Under the current communication topology, the process of the BCMU→BAMU realizes the data transmission of all battery voltages and the battery temperatures through one communication bus, which makes the communication time relatively long. High-speed and reliable information transmission is the basis of battery safety managements, and the long communication time has become a bottleneck that needs to be overcome in the battery safety managements.

Therefore, a heretofore unaddressed need exists in the art to address the aforementioned deficiencies and inadequacies.

SUMMARY OF THE INVENTION

In view of the aforementioned deficiencies and inadequacies in the prior art, one of the objectives of this invention is to provide an apparatus and a method for managing an energy storage power station, so as to solve the shortcomings that the existing technology cannot balance both high-speed and real-time performance in battery information communication managements.

In one aspect, the invention relates to an apparatus for managing an energy storage power station. The apparatus includes a first main control module communicatively connected with a battery cluster management unit (BCMU), and used to collect battery information of the first priority in an energy storage power station system, and perform protection and control on the energy storage power station system according to the battery information of the first priority; and a second main control module communicatively connected with the first main control module and the BCMU, respectively, and used to collect battery information of the second priority in the energy storage power station system, wherein the first priority is higher than said second priority. The second main control module operably transmits the collected battery information of the second priority to the first main control module, and the first main control module operably manages the battery information of the first priority and the battery information of the second priority in a unified manner.

In one embodiment, the battery information of the first priority includes summary information of the battery cluster, fault information and protection action information of the battery management unit and the BCMU; and the battery information of the second priority includes battery voltage information, temperature information and balance information.

In one embodiment, the first main control module is an ARM module, connected with the BCMU through the CAN communications.

In one embodiment, the second main control module is an FPGA module, connected with the bus of the first main control module, and connected with the BCMU through the CAN communications.

In one embodiment, the first main control module operably uploads the battery information of the first priority and the battery information of the second priority to the power management system through Ethernet.

In one embodiment, the energy storage power station system includes a high voltage box relay and an external protection device; the first main control module operably controls the high voltage box relay and/or the external protection device according to the battery information of the first priority.

In one embodiment, the BCMU is communicatively connected with at least two battery management units, and the battery management units operably upload the battery information of the first priority and the battery information of the second priority to the BCMU, wherein all battery management units form a battery cluster.

In one embodiment, the second main control module further collects the battery information of the first priority in the energy storage power station system, and transmits the collected battery information of the first priority to the first main control module.

In another aspect, the invention relates to a method for managing an energy storage power station. The method includes the steps of using a first main control module to collect battery information of a first priority in an energy storage power station system, and performing protection and control on the energy storage power station system according to the battery information of the first priority; the first main control module being communicatively connected with a BCMU;

using a second main control module to collect battery information of a second priority in the energy storage power station system; and transmitting, by the second main control module, the battery information of the second priority to the first main control module, and managing, by the first main control module, the battery information of the first priority and the battery information of the second priority in a unified manner.

In one embodiment, the battery information of the first priority includes summary information of the battery cluster, fault information and protection action information of the battery management unit and the BCMU; and the battery information of the second priority includes battery voltage information, temperature information and balance information.

Briefly, according to the invention, the battery cluster management unit classifies the collected information into the first priority information and the second priority information. Each battery cluster management unit has 2 CAN communication interfaces, one CAN communication interface transmits the first priority information to the first main control module, and the other CAN communication interface transmits the second priority information to the second main control module. The first priority information is basically fault information, with a small amount of information and a low sending frequency. Therefore, multiple battery cluster management units can share the CAN bus and quickly transmit important information to the first main control module for processing. The second priority information has a large amount of data and is transmitted frequently. The second main control module is an FPGA module, which can include multiple parallel CAN IPs that are respectively connected to different battery cluster management units for transmitting the second priority information thereof, which are then integrated and packaged to be delivered to the first main control module. Because the amount of the second priority information is large, such an arrangement significantly reduces the workload of the first module and thus increases the efficiency of data transmission.

In view of the foregoing, the apparatus and method for managing the energy storage power station have the following beneficial and advantageous effects:

By implementing the hardware functions of the BAMU through the combination of two main control modules, the invention can achieve both high speed and real-time performance, and real-time response and effective control of the battery system, and provide a solid foundation for improving battery management safety. On the other hand, when it is used to upgrade the BAMU hardware, there is no need to upgrade and change the hardware of the BMU and the BMCU, thereby reducing cost and time for the upgrade.

DETAILED DESCRIPTION OF THE INVENTION

Embodiments of the invention are described below through specific examples in conjunction with the accompanying drawings in FIGS. 1-4, and those skilled in the art can easily understand other advantages and effects of the invention from the content disclosed in this specification. The invention can also be implemented or applied through other different specific implementations, and various modifications or changes can be made to the details in this specification based on different viewpoints and applications without departing from the spirit of the invention. It should be noted that, in the case of no conflict, the following embodiments and features in the embodiments can be combined with each other.

It should be noted that the drawings provided in the following embodiments are merely illustrative in nature and serve to explain the principles of the invention, and are in no way intended to limit the invention, its application, or uses. Only the components related to the invention are shown in the drawings rather than the number, shape and size of the components in actual implementations. Dimensional drawing, the type, quantity and proportion of each component can be changed arbitrarily in its actual implementations. More complicate component layouts may also become apparent in view of the drawings, the specification, and the following claims.

The terms used in this specification generally have their ordinary meanings in the art, within the context of the invention, and in the specific context where each term is used. Certain terms used herein are for the purpose of describing particular embodiments and providing additional guidance to the practitioner and are not intended to be limiting of the invention. As used herein, the term "energy storage power station system" refers to a management system for managing an energy storage power station, while the term "energy storage power station" refers to energy storage devices such as batteries and a management system therefor.

In accordance with the purposes of the invention, as embodied and broadly described herein, this invention, in certain aspects, relates to an apparatus and a method for managing an energy storage power station, which replace the functions of the BAMU by combining two main control modules, thereby realizing both the high speed and real-time performance, realizing the real-time response and effective control of the battery system, and providing a solid foundation for improving the battery management safety.

Figure 1:
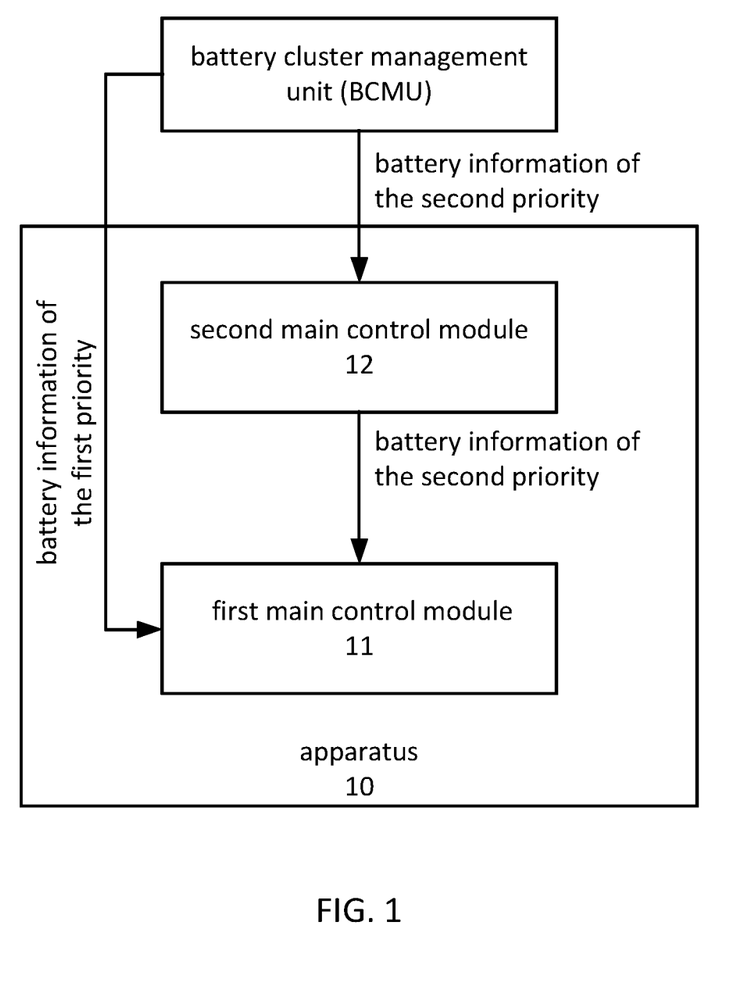
FIG. 1 shows schematically a structural diagram of an apparatus for managing an energy storage power station according to one embodiment of the invention.

Referring to FIG. 1, a structural schematic diagram of the apparatus for managing an energy storage power station is shown according to one embodiment of the present invention. As shown in FIG. 1, the apparatus 10 includes a first main control module 11 and a second main control module 12.

The first main control module 11 is configured to communicate with the battery cluster management unit (BCMU), and to collect/acquire the battery information of the first priority in the energy storage power station system, and protect the energy storage power station system according to the battery information of the first priority control.

The second main control module 12 is configured to communicate with the first main control module 11 and the BCMU, respectively, and collect the battery information of the second priority in the energy storage power station system. The first priority is higher than the second priority.

The second main control module 12 operably transmits the collected battery information of the second priority to the first main control module 11, and the first main control module 11 then operably manages the battery information of the first priority and the battery information of the second priority in a unified manner.

In one embodiment, the battery information of the first priority includes the summary information of the battery cluster, the fault information of the battery management unit and the BCMU, and the protection action information; and the battery information of the second priority includes the battery voltage information, the temperature information, and the balance information.

In one embodiment, the first main control module 11 operably uploads the battery information of the first priority and the battery information of the second priority to the power management system through Ethernet.

In one embodiment, the energy storage power station system includes a high voltage box relay and an external protection device. The first main control module 11 operably controls the high voltage box relay and/or the external protection device, based on the battery information of the first priority. Specifically, the protection action information is a control action of the BCMU on the high voltage box relay or other external protection devices, such as fire extinguishers and other related protection devices.

In one embodiment, the BCMU operably communicates with at least two battery management units. The battery management units operably upload the battery information of the first priority and the battery information of the second priority to the BCMU. All the battery management units form a battery cluster.

In an embodiment, the second main control module 12 is also configured to collect the battery information of the first priority in the energy storage power station system, and transmit the collected battery information of the first priority to the first main control module 11.

Figure 2:
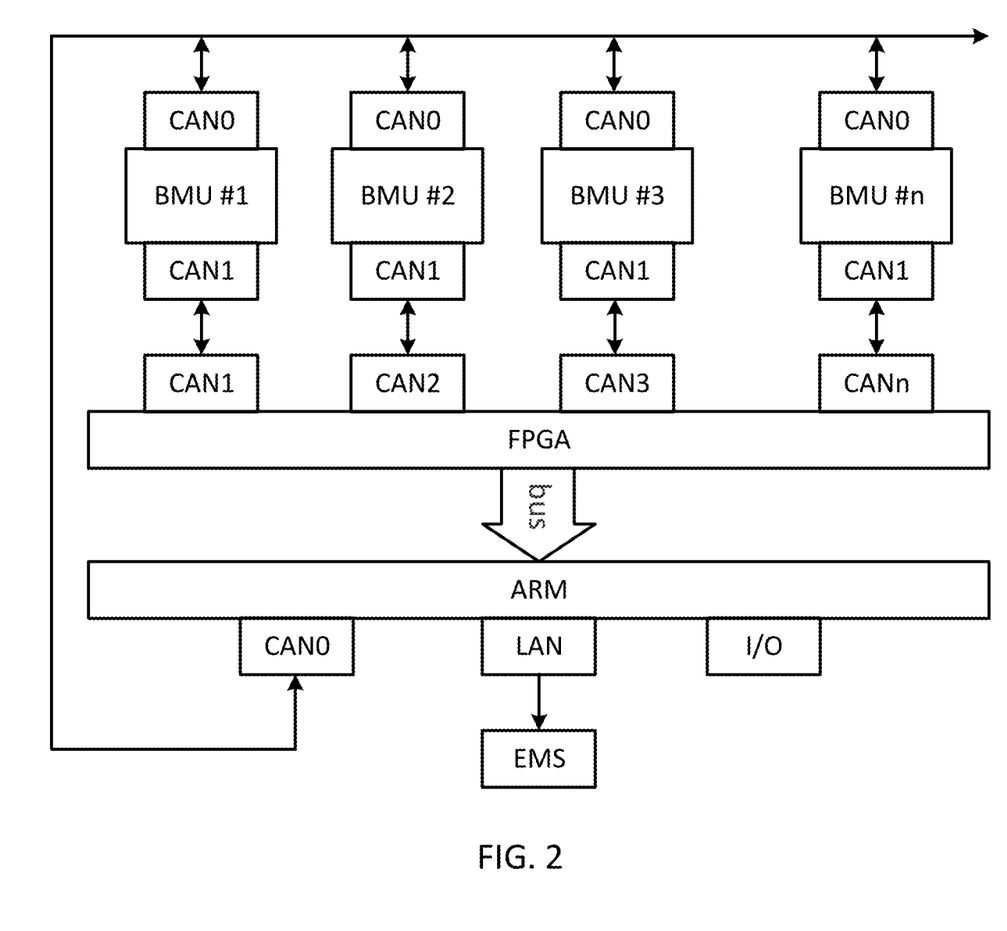
FIG. 2 shows schematically a communication architecture diagram of an apparatus for managing an energy storage power station according to one embodiment of the invention.

Referring to FIG. 2, a communication architecture diagram of the apparatus for managing an energy storage power station is schematically shown according to one embodiment of the invention. As shown in FIG. 2, the first main control module is an ARM (Advanced RISC Machine, which is an advanced RISC processor) module. The ARM module is operably connected to the BCMU by CAN (Controller Area Network) communications.

In one embodiment, the second main control module is an FPGA (Field-Programmable Gate Array) module, which is connected to the first main control module by bus and connected to the BCMU by the CAN communications. Therefore, using the multi-channel CAN channels developed based on the FPGA, the battery cluster data in the energy storage power station can be collected independently. Specifically, the collected battery cluster data is transmitted to the ARM processor through a high-speed AHB (Advanced High Performance Bus) or AXI (Advanced Microcontroller Bus Architecture Extensible Interface) bus. The ARM processor operably processes the collected data and uploads the processed data.

In one embodiment, for the hardware upgrade of the BAMU, the main control chip utilizes the FPGA plus ARM SoC (System on Chip) solution to replace the original single MCU (Microcontroller Unit) solution. Among them, the FPGA module is responsible for the acquisition of multiple CAN channels, and the ARM SoC module is responsible for the centralized processing and uploading of data, as well as the management and control functions of the original BAMU system.

In another embodiment, for the FPGA plus ARM SoC hardware solution, it can be a chip that integrates the FPGA core and the ARM SoC, such as Xilinx ZYNQ series, or a combination of an independent FPGA chip and an independent MCU, such as a combination of Xilinx Kintex-7 series with an NXP MCU.

For the BCMU hardware circuits, in order to consider reliable communication, most of them are designed as two-way CAN communication interfaces, one of which is used for main communications and the other is used for redundancy. Therefore, the CAN interface of the apparatus for managing an energy storage power station is divided into communication structures of 1+N channels from the protocol level. Of them, one (1) channel of the CAN interface is used for the bus-type communication structure, that is, CAN0 marked in FIG. 2, which is connected to each of the BMUs that constitute the BCMU, and used to a CAN port to transmit the summary information, fault information and protection of all clusters; and the remaining N CAN ports, namely CAN1 to CANn marked in FIG. 2, are independently connected to the BCMU module for uploading all information such as the battery voltage information, the temperature information, the balance information, and the fault information. As a result, key information with the highest priority, such as the fault information or the alarm information, can be uploaded to the main control with the fastest response speed. In one embodiment, the information upload cycle can be reduced from 10 seconds to 0.1 seconds, thereby realizing safe, efficient and timely protection of the battery system. At the same time, the redundant design structure of 1+N channels can increase the reliability of the entire communication links.

Figure 3:
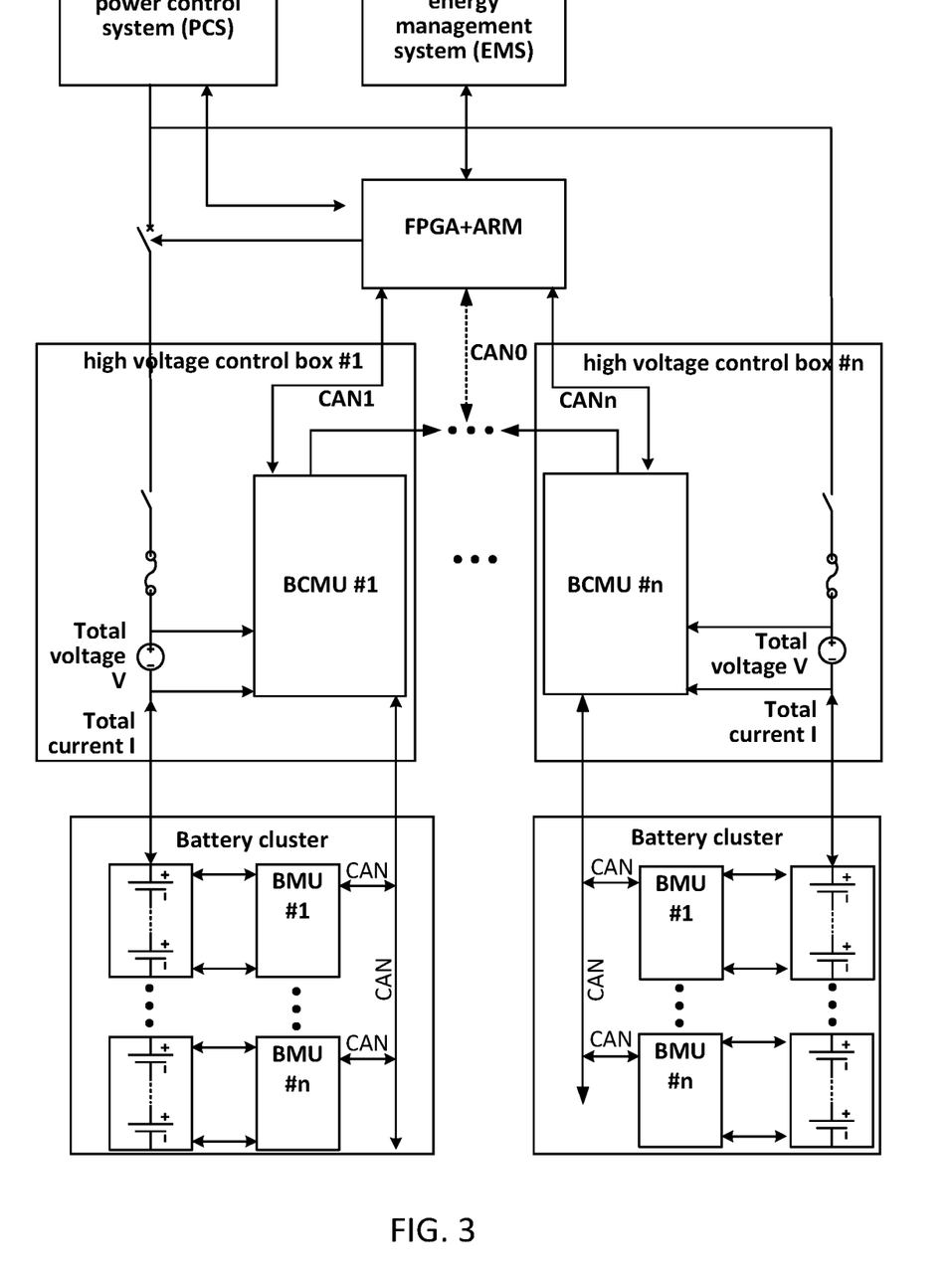
FIG. 3 shows schematically an energy storage power station management diagram of an apparatus for managing an energy storage power station according to one embodiment of the invention.

Referring to FIG. 3, an energy storage power station management diagram of an apparatus for managing an energy storage power station is schematically shown according to one embodiment of the invention. As shown in FIG. 3, each communication process of the energy storage power station in the invention is managed according to a list to form the communication data table of Table 1.

TABLE 1

Communication data table

| | BMU→BCMU | BCMU→BAMU (FPGA + ARM) | BAMU→EMS |
|---|---|---|---|
| Communication mode | CAN | CAN | LAN |
| Communication speed | 250K/500K | 250K/500K | 100M/1000M |
| Communication data | Single battery voltage information, single battery temperature information, balance status information, fault information, BMU's own status information, etc. | Battery pack information: single battery voltage information, single battery temperature information, balance status information, etc.; Cluster terminal information: total voltage, total current, cluster SOC, cluster SOH, cluster diagnostic information, cluster fault information, etc.; Cluster configuration information; Action protection information: high voltage box control disconnected. | Telemetry: battery system voltage, current, power SOC, SOH, insulation value, accumulated charge and discharge capacity, battery cluster information, single battery information; Remote signaling: fault information in BMS, cluster fault warning information, single fault warning information; Remote control: full charge, full discharge, start, stop. |

As listed in Table 1, there are three communication processes: BMU→BCMU, BCMU→BAMU (FPGA+ARM), and BAMU→EMS.

In the communication process of BMU→BCMU, the communication method is CAN, the communication speed is 250K/500K, and the communication data includes single battery voltage information, single battery temperature information, balance status information, fault information, BMU's own status information, etc.

In the communication process of BCMU→BAMU (FPGA+ARM), the communication method is CAN, the communication speed is 250K/500K, and the communication data includes battery pack information including single battery voltage information, single battery temperature information, balance status information, etc.; cluster terminal information including total voltage, total current, cluster SOC (State Of Charge), cluster SOH (State Of Health), cluster diagnostic information, cluster fault information, etc.; cluster configuration information; and action protection information including high voltage box control disconnected, etc.

In the communication process of BAMU→EMS, the communication method is LAN (Local Area Network), the communication speed is 100M/1000M, and the communication data includes telemetry including battery system voltage, current, power SOC, SOH, insulation value, accumulated charge and discharge capacity, battery cluster information, and single battery information; remote signaling including fault information in BMS, cluster fault warning information, and single fault warning information; and remote control: including full charge, full discharge, start, and stop.

As shown in FIG. 3, the battery cluster composed of the BMUs is connected to the BCMU of the BCMU through the CAN communications. For example, N battery cluster management units are n high-voltage control boxes, and the first priority battery information of each high-voltage control box including the summary information of the battery cluster, the fault information of the battery management unit and the BCMU, and the protection action information are transmitted to the ARM through CAN0; the second priority battery information of each high-voltage control box including battery voltage information, temperature information and balance Information etc. are transmitted to the FPGA through CAN1 to CANn, and then transmitted to the ARM by the FPGA. In addition, the first-priority battery information of each high-voltage control box including the summary information of the battery cluster, the fault information of the battery management unit and the BCMU, and the protection action information are also transmitted to the FPGA through CAN1 to CANn, and then transmitted to the ARM, thus plays a redundant role. The BAMU composed of FPGA and ARM communicates with the energy management system (EMS) and a power control system (PCS).

In one embodiment, in the communication topology, as shown in Table 1, taking the transmission of the battery voltage information and the battery temperature information as an example, combined with FIG. 2, the communication process includes the following six steps:

(1) The BMU collects the battery voltage information and the battery temperature information.

(2) The BMU uploads the battery voltage information and the battery temperature information to the BCMU through the CAN bus.

(3) The BCMU receives the battery voltage information and the battery temperature information from the BMU module, and caches the battery voltage information and the battery temperature information of all BMU modules.

(4) The BCMU uploads the battery voltage information and the battery temperature information of all battery clusters to FPGA through CAN1 to CANn bus.

(5) The FPGA receives the BCMU data and transmits it to the ARM through the AHB or AXI bus, and the ARM caches all data on the CAN bus.

(6) The ARM uploads all battery voltage and temperature data to the EMS via Ethernet.

In another embodiment, in the communication topology, as shown in Table 1, taking the transmission of the summary information of the battery cluster, the fault information and the protection action information as an example, combined with FIG. 2, the communication process includes the following three steps:

(1) The BCMU forms the summary information, the fault information and the protection action information of the battery cluster based on the information of each single battery in the BMU and the status information of the BMU itself.

(2) The BCMU uploads the summary information, the fault information and the protection action information of all battery clusters to the ARM through the CAN0 bus.

(3) The ARM controls the relevant protection devices in the energy storage power station to perform protection actions according to the received summary information of the battery clusters, the fault information and the protection action information.

Figure 4:
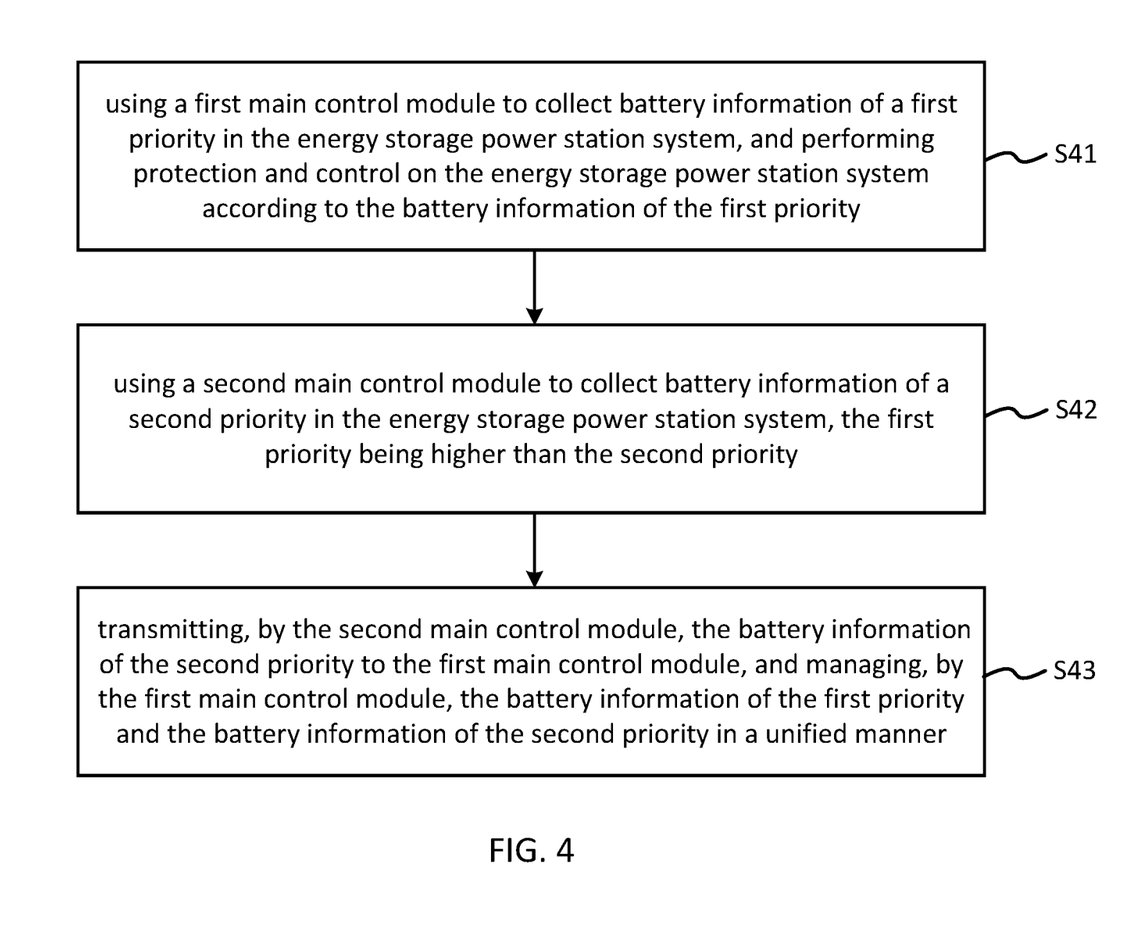
FIG. 4 shows schematically a flowchart of a method for managing an energy storage power station according to one embodiment of the invention.

Referring to FIG. 4, a flowchart of the method for managing an energy storage power station is schematically shown according to one embodiment of the invention. As shown in FIG. 4, the method specifically includes the following steps:

Step S41, using the first main control module to collect the battery information of the first priority in the energy storage power station system, and performing protection and control on the energy storage power station system according to the battery information of the first priority; the first main control module is in communication connection with the battery cluster management unit.

Step S42, using the second main control module to collect the battery information of the second priority in the energy storage power station system. The first priority is higher than the second priority. The second main control module is in communication connection with the first main control module and the battery cluster management unit, respectively.

Step S43, making the second main control module transmit the collected battery information of the second priority to the first main control module. The first main control module manages the battery information of the first priority and the battery information of the second priority in a unified manner.

In one embodiment, the battery information of the first priority includes the summary information of the battery cluster, the fault information of the battery management unit and the battery cluster management unit, and the protection action information; the battery information of the second priority includes the battery voltage information, the temperature information and the balance (equalization) information.

Therefore, the invention discloses a CAN communication mode of 1+N channels, and meanwhile makes the collection time shorter and the timeliness of uploading important information. Based on the improvement of the EMS acquisition system, the quantity cost of hardware replacement and the difficulty of hardware replacement are reduced. The FPGA implements multi-channel CAN channels through soft-core IP. The number of channels can be dynamically configured according to actual application scenarios. Compared with MCUs that integrate multiple CAN channels available on the market, the solution according to the invention is easier to implement and more scalable.

Briefly, according to the invention, the battery cluster management unit classifies the collected information into the first priority information and the second priority information. Each battery cluster management unit has 2 CAN communication interfaces, one CAN communication interface transmits the first priority information to the first main control module, and the other CAN communication interface transmits the second priority information to the second main control module. The first priority information is basically fault information, with a small amount of information and a low sending frequency. Therefore, multiple battery cluster management units can share the CAN bus and quickly transmit important information to the first main control module for processing. The second priority information has a large amount of data and is transmitted frequently. The second main control module is an FPGA module, which can include multiple parallel CAN IPs that are respectively connected to different battery cluster management units for transmitting the second priority information thereof, which are then integrated and packaged to be delivered to the first main control module. Because the amount of the second priority information is large, such an arrangement significantly reduces the workload of the first module and thus increases the efficiency of data transmission.

The scope of protection of the method for managing an energy storage power station described in the invention is not limited to the execution order of the steps listed in the embodiments, and all solutions realized by the increase or decrease of steps and the replacement of steps in the prior art according to the principles of the invention are included within the protection scope of the invention.

The principle of the apparatus for managing the energy storage power station according to the invention corresponds to the method for managing the energy storage power station described in the invention. The apparatus for managing the energy storage power station can realize the method for managing the energy storage power station. However, the implementation device of the method for managing the energy storage power station described in the invention includes, but is not limited to, the structure of the apparatus for managing the energy storage power station listed in the embodiments. Any structural changes and replacements of the prior art made according to the principle of the invention are included in the scope of protection of the invention.

In summary, the apparatus and method for managing an energy storage power station of the invention can realize the hardware function of the BAMU through the combination of two main control modules, realize both high speed and real-time performance, and realize real-time response and effective response to the battery system, and provide a solid foundation for improving battery management safety. On the other hand, when it is used to upgrade the BAMU hardware, there is no need to upgrade and change the hardware of the BMU and the BMCU, and the transformation cost is low and the transformation time is short. The invention effectively overcomes various shortcomings in the prior art and has high industrial application value.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. An apparatus for managing an energy storage power station, comprising:
    a first main control module communicatively connected with a battery cluster management unit (BCMU), and used to collect battery information of a first priority in an energy storage power station system, and perform protection and control on the energy storage power station system according to the battery information of the first priority; and
    a second main control module communicatively connected with the first main control module and the BCMU, and used to collect battery information of a second priority in the energy storage power station system, wherein the first priority is higher than said second priority;
    wherein the second main control module operably transmits the collected battery information of the second priority to the first main control module, and the first main control module operably manages the battery information of the first priority and the battery information of the second priority in a unified manner; wherein the battery information of the first priority is transmitted to the first main control module through a first CAN channel, and the battery information of the second priority is transmitted to the second main control module through a second CAN channel; wherein the second CAN channel includes at least two CAN channels for parallel transmission, and different second CAN channels correspond to different battery management units, and are used to transmit the battery information of the second priority of each battery management unit in parallel;
    wherein the battery information of the first priority includes summary information of the battery cluster, fault information and protection action information of the battery management unit and the battery cluster management unit; and the battery information of the second priority includes battery voltage information, temperature information and balance information;
    wherein the first main control module is an ARM module, connected with the battery cluster management units through the CAN communications;
    wherein the second main control module is an FPGA module, connected with the bus of the first main control module, and connected with the battery cluster management units through the CAN communications; and
    wherein the first main control module operably uploads the battery information of the first priority and the battery information of the second priority to an energy management system (EMS) through Ethernet.

2. The apparatus according to claim 1,
    wherein the energy storage power station system includes a high voltage box relay and an external protection device; and wherein the first main control module operably controls the high voltage box relay and/or the external protection device according to the battery information of the first priority.

3. The apparatus according to claim 1, wherein the BCMU is communicatively connected with at least two battery management units, and the battery management units operably upload the battery information of the first priority and the battery information of the second priority to the BCMU, wherein all battery management units form a battery cluster.

4. The apparatus according to claim 1, wherein the second main control module further collects the battery information of the first priority in the energy storage power station system, and transmits the collected battery information of the first priority to the first main control module.

5. A method for managing an energy storage power station, comprising:
   using a first main control module to collect battery information of a first priority in an energy storage power station system, and performing protection and control on the energy storage power station system according to the battery information of the first priority; the first main control module being communicatively connected with a battery cluster management unit (BCMU);
   using a second main control module to collect battery information of a second priority in the energy storage power station system; wherein the first priority is higher than the second priority; wherein the second main control module is communicatively connected with the first main control module and the BCMU; and
   transmitting, by the second main control module, the battery information of the second priority to the first main control module, and managing, by the first main control module, the battery information of the first priority and the battery information of the second priority in a unified manner, wherein the battery information of the first priority is transmitted to the first main control module through a first CAN channel, and the battery information of the second priority is transmitted to the second main control module through a second CAN channel; wherein the second CAN channel includes at least two CAN channels for parallel transmission, and different second CAN channels correspond to different battery management units, and are used to transmit the battery information of the second priority of each battery management unit in parallel
   wherein the battery information of the first priority includes summary information of the battery cluster, fault information and protection action information of the battery management unit and the battery cluster management unit; and the battery information of the second priority includes battery voltage information, temperature information and balance information;
   wherein the first main control module is an ARM module, connected with the battery cluster management units through the CAN communications;
   wherein the second main control module is an FPGA module, connected with the bus of the first main control module, and connected with the battery cluster management units through the CAN communications; and
   wherein the first main control module operably uploads the battery information of the first priority and the battery information of the second priority to an energy management system (EMS) through Ethernet.

* * * * *